Patented Mar. 30, 1954

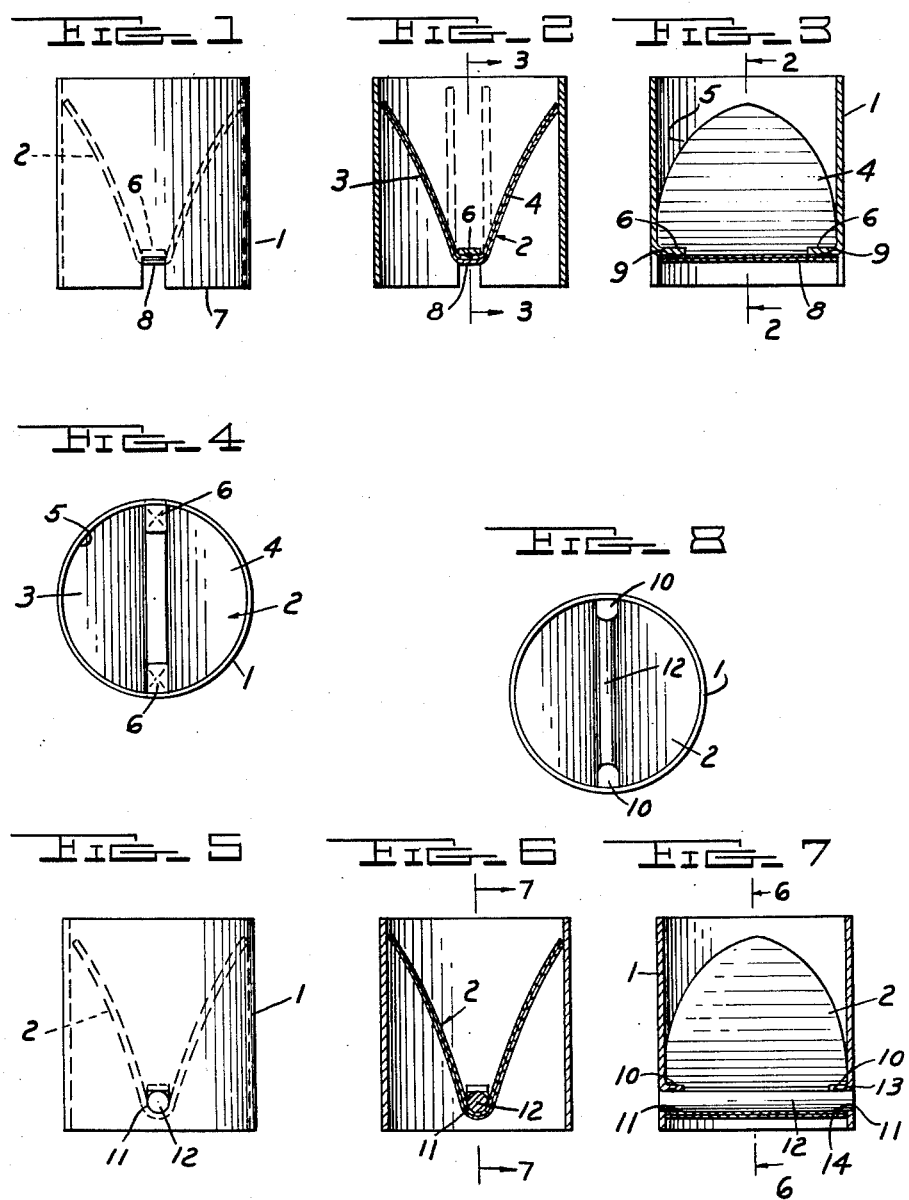

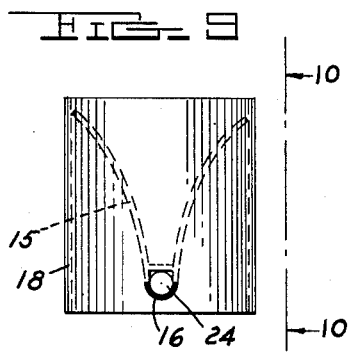
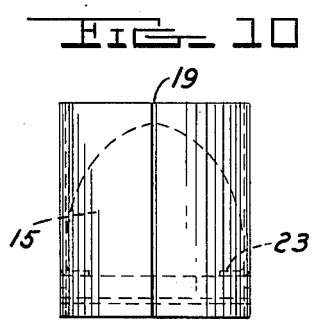
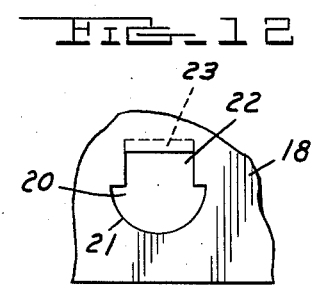
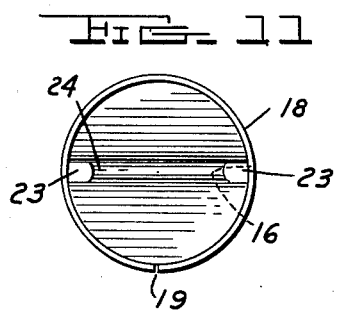
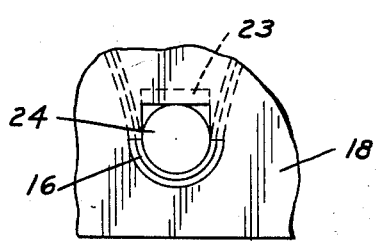
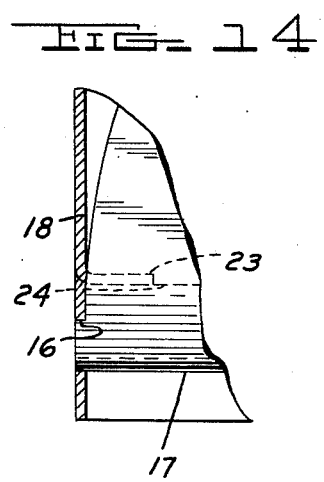
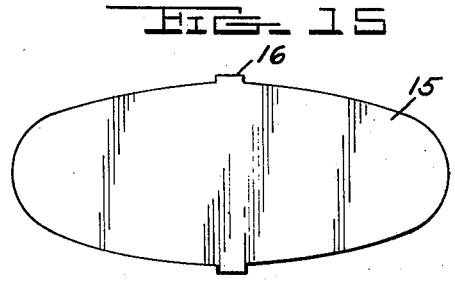

2,673,687

UNITED STATES PATENT OFFICE 2,673,687

THERMOSTATIC VALVE

Clarence F. Alban, Pontiac, and William C. Hill, Detroit, Mich., assignors to W. M. Chace Company, Detroit, Mich., a corporation of Michigan Application August 3, 1949, Serial No. 108,268

3 Claims. (Cl. 236—93)

This invention relates to a thermostatic valve.

This invention is particularly concerned with the mounting of a so-called "duck bill" type valve of thermostatic laminated metal in a tubular housing. These valves are useful for many purposes and in particular for controlling the flow of exhaust gases through the exhaust line of an internal combustion engine. In such last mentioned use the thermostatic valve acts to direct the flow of hot exhaust gases from the internal combustion engine through the hot box section of the intake manifold while the engine is cold and during the warming-up period of operation of the engine to assist in vaporizing the fuel charge. It is therefore important that the mounting of the thermostatic valve within its housing should be permanent and secure in order to withstand the vibrations set up by the alternate firing of the engine cylinders and the repeated flexing of the valve as it opens and closes.

This invention contemplates a mounting for a valve of laminated thermostatic metal which is economical to produce, simple in structure, which will not impair or impede the flexing of the valve blades in response to temperature change, and which is long-lived.

Fig. 1 is an elevation of our valve assembly.

Fig. 2 is a longitudinal section thereof taken along the line 2—2 of Fig. 3.

Fig. 3 is a longitudinal section of our valve taken along the line 3—3 of Fig. 2.

Fig. 4 is a top plan view of our valve assembly looking downwardly upon the valve assembly as shown in Fig. 1.

Fig. 5 is an elevation of a modified form of our valve assembly.

Fig. 6 is a longitudinal section thereof taken along the line 6—6 of Fig. 7.

Fig. 7 is a longitudinal section of the modified form of our valve taken along the line 7—7 of Fig. 6.

Fig. 8 is a top plan view of the modified form of our valve assembly looking downwardly upon the valve assembly as shown in Fig. 5.

Fig. 9 is an elevation of a second modified form of our valve assembly.

Fig. 10 is an elevation of the second modified form of our valve assembly taken along the line 10—10 of Fig. 9.

Fig. 11 is a top plan view of the valve assembly shown in Figs. 9 and 10.

Fig. 12 is a detail showing one of the openings in the valve housing of the second modified form of our valve assembly before the valve and support bar are mounted in the housing.

Fig. 13 is a detail elevation showing the mounting of the valve and support bar in the housing of our second modified form of valve assembly.

Fig. 14 is a fragmentary view partly in section showing such mounting.

Fig. 15 is a plan view of the bimetal blank preparatory to bending it back upon itself to form the duck bill type valve for the second modified form of our valve assembly.

Referring to the form of valve assembly shown in Figs. 1 through 4: This assembly comprises a housing 1 in the form of a tube and a duck bill type valve 2 of laminated thermostatic metal such, for example, as bimetal or trimetal. Tube 1 is preferably a cylindrical tube but can also be of square cross-section or other polygonal cross-section. Valve 2 preferably comprises a single strip of thermostatic laminated metal bent back upon itself to form blades 3 and 4. The periphery 5 of blades 3 and 4 will conform to the inside contour of housing 1 when flexed to closed position in response to temperature change. When housing 1 is a cylindrical tube, then the periphery 5 of each blade will take substantially the form of a semi-ellipse.

The bimetal valve 2 can have its lamination with the higher thermal expansion rate either on the outside or the inside depending upon whether it is desired to have the valve close housing 1, as shown in the drawings, in response to a temperature rise or to collapse and open housing 1 in response to a temperature rise. Where the valve assembly is used in the exhaust line of an internal combustion engine, as above set forth, the lamination or side having the higher thermal expansion rate will be positioned on the outside of the valve so that the valve will collapse and open housing 1 in response to a temperature rise.

For mounting valve 2 within housing 1, which is preferably a metal tube, ears 6 are sheared or lanced out of tube 1 from the lower edge 7 and turned inwardly to the position shown in Fig. 3 at substantially right angles to the longitudinal axis of the housing 1. Duck bill valve 2 is slid into housing 1 until the inside face of the bight portion 8 of valve 2 rests upon ears 6. Ears 6 are then welded to the bight portion 8 as indicated at 9. Valve 2 is now free to collapse to open position, dotted line showing Fig. 2, in response to temperature change such, for example, as a rise in temperature, and is free to expand or flex to closed position, full line showing Fig. 2, in response to an opposite temperature change, such, for example, as a fall in temperature.

The modified form of valve assembly shown in Figs. 5 through 8 comprises a valve 2 and housing 1 the same as above described. In this form of the invention ears 10 are lanced and turned inwardly at right angles to the longitudinal axis of tube 1 to form diametrically opposite openings 11 in housing 1. A metal bar 12 is positioned across the outside diameter of tube 1 and is supported at each end in openings 11. The bar can be placed in position by sliding the same lengthwise through one opening 11 until the leading end of the bar seats in the opposite opening 11. The valve 2 is now positioned into housing 1 with the inner face of the bight portion 8 seating upon bar 12. Preferably bar 12 is spot welded to ears 10 as indicated at 13 and the bight portion of valve 2 is spot welded to bar 12 as indicated at 14.

The second modified form of our valve assembly is shown in Figs. 9 through 15 and consists of a valve 15 of thermostatic laminated metal identical with the above described valve 2 except that the valve 15 is provided with opposed ears 16 at opposite ends of the bight portion 17 of the valve. Fig. 15 shows the valve in blank form before it is bent into duck bill shape.

The tubular housing 18 for the valve is preferably in the form of a split tube, the split 19 running lengthwise of the tube, as shown in Figs. 10 and 11. Housing 18 is provided with opposed openings 20 of the contour shown in Fig. 12. Each opening is provided with a saddle portion 21 in the form of a semi-circle and a reduced neck portion 22 produced by shearing or lancing out ears 23 which are turned inwardly in the same manner as ears 6 and 10 above described.

Valve 15 is positioned in the housing with arcuate ears 16 seated upon saddle portions 21. Ears 16 project into openings 20 and are substantially flush with the outside of the tube wall, as shown in Fig. 14. In inserting valve 15 into tube 18, tube 18, due to split 19, will expand until ears 16 seat in openings 20 whereupon the tube contracts and tube 18 cooperates with ears 16 to resiliently lock or secure the valve 15 in tube 18.

Bar 24 is positioned in the bight portion 17 of valve 15 and projects into openings 20 between fingers 23 and the inside of bight portion 17 of valve 15. Bar 24 locks valve 15 in housing 18 and obviates the need for welding the assembly together. However, if desired, bar 24 can be welded to the bight portion of the valve and to fingers 23, as described above, with respect to the first modified form of our valve assembly.

Since bar 24 has a pressed or forced or tight fit in openings 20 between ears 23 and bight portion 17 of valve 2, welding of the assembly together is not necessary.

We claim:

1. A valve assembly comprising a tube provided with diametrically opposed ears, diametrically opposed openings in the wall of said tube and adjacent said ears, a duck billed valve of thermostatic laminated metal positioned within said tube with the bight portion of said valve extending substantially across the inside diameter of said tube, the said ears projecting inwardly of the wall of the tube in a direction generally towards each other and forming diametrically opposed supports which project inwardly of the inner face of the wall of the tube, said ears projecting between the blades of said valve, and a bar support positioned in the bight portion of said valve and having its ends extending into and supported in said opposed openings, the said bar contacting said ears on one side and the bight portion of said valve on its opposite side, and means cooperating with the valve, bar and ears for securing the same together.

2. The valve assembly claimed in claim 1 wherein the ears and the bight portion of said valve are welded to said bar.

3. A valve assembly comprising a tube provided with diametrically opposed inwardly projecting ears in the wall thereof, diametrically opposed openings in the wall of said tube and adjacent said ears, a duck billed valve of thermostatic laminated metal positioned within said tube with the bight portion of said valve extending substantially across the inside diameter of said tube, the said ears being positioned between the blades of said valve adjacent and on the inner side of said bight portion, and a bar support positioned in the bight portion of said valve and having its ends extending into and supported on one side in said opposed openings, the said ears contacting the opposite side of said bar, and means cooperating with the valve, bar and ears for securing the same together.

CLARENCE F. ALBAN.
WILLIAM C. HILL.

References Cited in the file of this patent

UNITED STATES PATENTS

| Number | Name | Date |
|---|---|---|
| 1,608,205 | Francke | Nov. 23, 1926 |
| 1,665,725 | Aeby | Apr. 10, 1928 |
| 2,109,628 | Alban et al. | Mar. 1, 1938 |
| 2,161,924 | Jack | June 13, 1939 |